(12) United States Patent
Hwang et al.

(10) Patent No.: US 10,289,784 B1
(45) Date of Patent: May 14, 2019

(54) DETERMINATION OF CLOCK PATH DELAYS AND IMPLEMENTATION OF A CIRCUIT DESIGN

(71) Applicant: Xilinx, Inc., San Jose, CA (US)

(72) Inventors: Chiao K. Hwang, Bakersfield, CA (US); Zicheng G. Ling, San Jose, CA (US); Nagaraj Savithri, Richardson, TX (US)

(73) Assignee: XILINX, INC., San Jose, CA (US)

( * ) Notice: Subject to any disclaimer, the term of this patent is extended or adjusted under 35 U.S.C. 154(b) by 90 days.

(21) Appl. No.: 15/432,537

(22) Filed: Feb. 14, 2017

(51) Int. Cl.
*G06F 17/50* (2006.01)
(52) U.S. Cl.
CPC ........ *G06F 17/505* (2013.01); *G06F 17/5081* (2013.01); *G06F 2217/06* (2013.01)
(58) Field of Classification Search
CPC .... G06F 2217/62; G06F 1/10; G06F 17/5031; G06F 17/5068; G06F 17/5077; G06F 17/5081
USPC ........................................................ 716/113
See application file for complete search history.

(56) References Cited

U.S. PATENT DOCUMENTS

| | | | |
|---|---|---|---|
| 2004/0015801 A1* | 1/2004 | Mielke | G06F 17/5031 716/113 |
| 2014/0289690 A1* | 9/2014 | Chopra | G06F 17/5077 716/113 |

OTHER PUBLICATIONS

U.S. Appl. No. 15/213,214, filed Jul. 18, 2016, Eslami Dehkordi, Mehrdad, San Jose, CA USA.

* cited by examiner

*Primary Examiner* — Paul Dinh
(74) *Attorney, Agent, or Firm* — LeRoy D. Maunu

(57) ABSTRACT

The disclosed approaches process a circuit design that specifies a clock signal. A plurality of wire segments of an integrated circuit (IC) are selected for a clock path to carry the clock signal. A delay of the clock path is determined based on delay values associated with identifiers of the wire segments and variation factors. Configuration data is generated from the circuit design once the delay of the clock path satisfies a timing constraint, and a circuit is generated from the configuration data to implement a circuit according to the circuit design.

16 Claims, 7 Drawing Sheets

US 10,289,784 B1

DETERMINATION OF CLOCK PATH DELAYS AND IMPLEMENTATION OF A CIRCUIT DESIGN

TECHNICAL FIELD

The disclosure generally relates to determining delays of clock paths in a circuit design and implementing a circuit from the circuit design.

BACKGROUND

Circuit designers analyze the timing of circuit designs in order to verify that a circuit implemented from the circuit design will operate as intended. Setup and hold time violations are identified and paths of the circuit design adjusted accordingly. A critical path is generally recognized as any path that has a setup or hold time violation.

Static timing analysis (STA) uses timing models of circuit elements to determine delays of paths in the circuit design. The timing models associate delay values with circuit elements, and the delay of a path can be computed as the sum of the delay values of the circuit elements on the path. STA sometimes produces results that are too optimistic or overly pessimistic. If the path delay is too optimistic, the physical circuit path may violate timing constraints even though STA indicated the path is legal. If the delay is too pessimistic, the physical circuit path may have enough slack to have supported a faster clock speed without violating timing constraints.

STA tools generally assume that topologically similar clock paths have the same delay. A clock path begins at a clock source and terminates at the clock pin or clock-enable pin of a bi-stable circuit. That is, clock paths having the same length and same line widths would have the same delay. In order to handle process-related differences between the delays of topologically similar clock paths, STA tools have assumed a worst-case delay for the paths. However, assuming the worst-case delay may result in an implemented circuit that operates at frequency that is slower than a frequency that may be otherwise achieved.

SUMMARY

In one approach a method of processing a circuit design includes inputting a circuit design to a programmed processor. The processor selects a plurality of wire segments of an integrated circuit (IC) for a clock path to carry a clock signal of the circuit design. The processor determines a delay of the clock path based on delay values associated with identifiers of the wire segments and one or more variation factors. The processor generates configuration data from the circuit design in response to the delay of the clock path satisfying a timing constraint, and generates a circuit from the configuration data to implement a circuit according to the circuit design.

Another method of processing a circuit design includes inputting the circuit design to a programmed processor. The processor selects a first plurality of wire segments of an integrated circuit (IC) for a first clock path and a second plurality of wire segments for a second clock path to carry the clock signal. The processor determines a first delay of the first clock path based on delay values associated with identifiers of the first plurality of wire segments and one or more variation. The processor also determines a second delay of the second clock path based on delay values associated with identifiers of the second plurality of wire segments and the variation factors. The processor generates configuration data from the circuit design in response to a difference between the first delay and the second delay satisfying a timing constraint, and generates a circuit from the configuration data to implement a circuit according to the circuit design.

A system for processing a circuit design is also disclosed. The system includes a processor and a memory coupled to the processor. The memory is configured with instructions that when executed by the processor cause the processor to perform operations for processing a circuit design. The operations include inputting the circuit design and selecting a plurality of wire segments of an integrated circuit (IC) for a clock path to carry a clock signal of the circuit design. A delay of the clock path is determined based on delay values associated with identifiers of the wire segments and one or more variation factors. Configuration data is generated from the circuit design in response to the delay of the clock path satisfying a timing constraint, and a circuit is generated from the configuration data to implement a circuit according to the circuit design.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
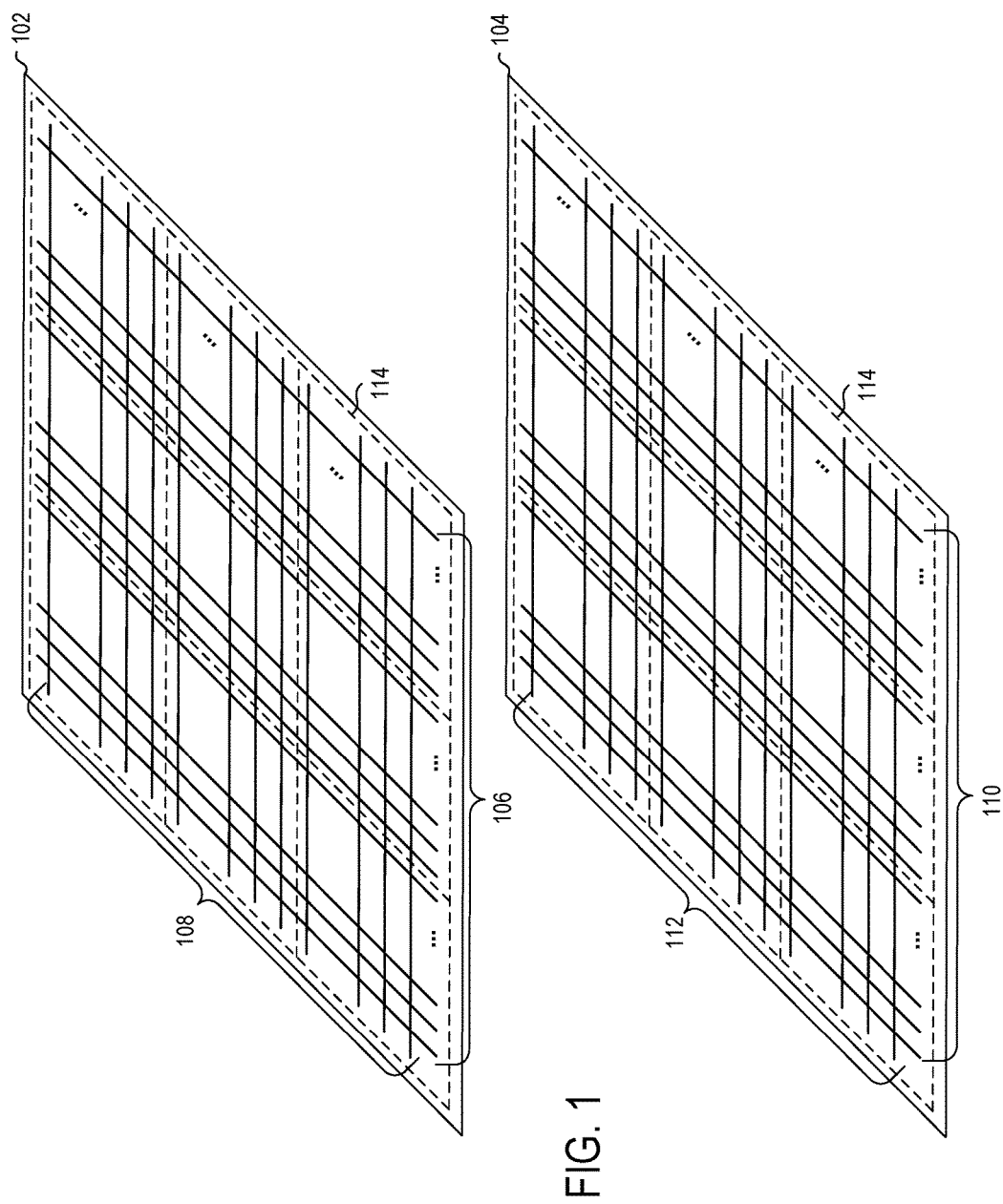
FIG. 1 shows examples of a routing layer and a distribution layer of a clock distribution network of a programmable IC.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

FPGA architectures have evolved over time to include topologically similar clock routes and programmable delays. Clock delays on topologically "similar" routes have been assumed to be identical. However, due to proximity effects and random variations in advanced manufacturing technologies, clock delays on seemingly similar routes can be quite different. The disclosed methods and systems account for proximity effects and random variations in clock paths and provide more accurate clock skew prediction and optimization than in prior systems.

In the disclosed approaches, the proximity of wire segments of a clock path to physical structures of an integrated circuit (IC) is used to assess the delay of the clock path. In another approach, the metal layer on which a clock path, or a portion of the clock path is disposed is further used in calculating the delay of the clock path. In clock paths having programmable delay circuits, the disclosed approaches adjust for random variations in the delay circuits. Still other approaches place clock roots and branches in a manner that attempts to maximize the use of similar routes and thereby minimize clock skew.

The disclosed methods and systems attempt to accurately determine clock skew in a circuit design. Some programmable ICs, such as ULTRASCALE™ devices from XILINX®, Inc., have a programmable clock distribution network. The clock distribution network includes two independent meshes of routing and distribution grids.

FIG. 1 shows examples of a routing layer 102 and a distribution layer 104 of a clock distribution network of a programmable IC. The layers may be part of a programmable IC having programmable logic, input/output (I/O), signal routing, and processor resources (see FIG. 8), for example. The routing layer and distribution layer include respective sets of clock distribution tracks. Each set of distribution tracks includes horizontal tracks and vertical tracks. For example, the routing layer includes vertical tracks 106 and horizontal tracks 108, and the distribution layer includes vertical tracks 110 and horizontal tracks 112. Those skilled in the art will recognize that an actual device would be much larger and have many more clock distribution tracks.

The clock distribution network may be configured to route a clock signal from a clock source to any clock region in the device via horizontal and vertical tracks of the routing layer. The example clock distribution network includes 9 regions, which are outlined with dashed lines in the routing and distribution layers. Region 114 is an example of one of the regions in the routing and distribution layers.

The programmable interconnection point at which a track of the routing layer is connected to a vertical track of the distribution layer may be referred to as the clock root. The region in which the track of the routing layer is connected to the vertical track of the distribution layer may be referred to as the root region. A clock tree can be expanded from the clock root and root region by connecting selected horizontal distribution-layer tracks to the vertical track that has the clock root, and extending the horizontal distribution tracks to all regions where loads of the clock tree are placed. The portion of the distribution-layer vertical track to which the routing-layer track connects may be referred to as a "spine" of the clock tree, and the portions of the horizontal distribution tracks connected to the spine may be referred to as branches. Each of the vertical and horizontal tracks may also be referred to as a wire segment. Similarly, a portion of a vertical track or a horizontal track may also be referred to as a wire segment.

Programmable delays on the branches are set to values that attempt to equalize the delays in a clock tree from the clock root to the loads in the different clock regions. For example, for each branch of the clock tree that is nearer the clock root than another branch of the clock tree, the initial delay value of the closer branch is greater than the initial delay value of the branch that is farther from the clock root.

Many STA tools have assumed that topologically similar wire segments have the same delay. For example, two wire segments that are implemented on two vertical tracks of the same length have been assumed to have the same delay. However, a number of different factors may affect the actual delays of the wire segments, resulting in topologically similar wire segments having different delays.

The proximity of wire segments to physical circuit structures on the IC may affect the delay. For example, as between two topologically similar wire segments one wire segment may be proximate a configurable logic block in a different metal layer, such as by passing over the configurable logic, and the other wire segment may not pass over a configurable logic block. The wire segment that passes over the configurable logic block may have a greater delay than the other wire segment. In another example, topologically similar wire segments may be disposed in different metal layers of the IC, and one of the metal layers may cause more delay than the other metal layer. In addition to proximity effects and different metal layers, random variations between the actual delay of a programmable delay circuit in a clock path and the expected delay of the programmable delay circuit may result from manufacturing processes and differences in voltage and/or temperature.

Figure 2:
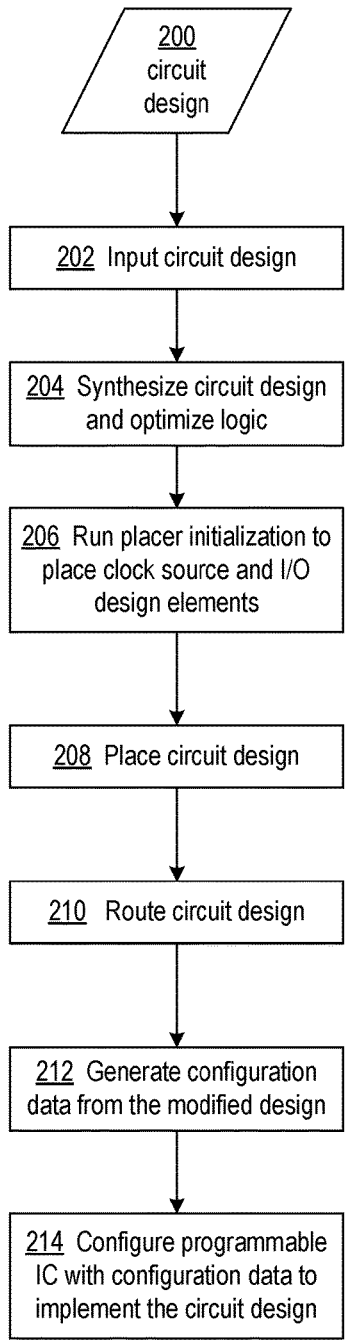
FIG. 2 shows a flowchart of a process for generating a circuit from a circuit design and accounting for proximity effects and random variations during placement and routing of the circuit design.

FIG. 2 shows a flowchart of a process for generating a circuit from a circuit design and accounting for proximity effects and random variations during placement and routing of the circuit design. An electronic design automation (EDA) tool executing on a processor inputs circuit design 200 at block 202. The EDA tool synthesizes the circuit design and optimizes logic at block 204. Once synthesized, at block 206 the EDA tool runs placer initialization that establishes locations on the target device for clock sources and I/O circuit elements of the circuit design.

At block 208, the EDA tool places the circuit design, such as by performing global and detailed placement processes. The global placement process attempts to determine a well spread, ideally with no overlaps, placement of the cells for a given netlist, such that the placement attains the required objectives such as wirelength minimization or timing specifications. Some global placement algorithms include analytic techniques which approximate the wirelength objective using quadratic or nonlinear formulations, partitioning-based placement algorithms and stochastic techniques. The global placement also generates initial clock trees for the circuit design. The detailed placement process attempts to legalize the result from global placement with as little cell movement as possible. In addition, detailed placement has more concrete objectives on meeting the timing specifications and minimizing wirelength. As part of the global and detailed placement processes, the EDA tool performs static timing analysis on the placed circuit design at various stages and changes the placement of circuit elements if timing constraints are not satisfied.

If the placed circuit design satisfies timing constraints, the EDA tool routes the circuit design at block 210. Part of routing the circuit design involves computing delays of clock paths. In accordance with the disclosed systems and methods, the delays are calculated using proximity factors, metal layer variation factors, and statistical factors for random variations of programmable delay circuits. A proximity factor characterizes an additional amount of delay that results from a wire segment being proximate a circuit structure on the IC. A metal layer variation factor characterizes an additional amount of delay that results from a wire segment being in a particular metal layer. The statistical factors account for random variations in the delays of programmable delay circuits in a clock path.

At block 212, configuration data is generated from the placed-and-routed circuit design. For example, bitstream generation tools may be executed on a processor to generate configuration data for a programmable IC having a field programmable gate array (FPGA). At block 214, a programmable IC may be configured with the configuration data, thereby creating clock trees in a circuit that operates according to the circuit design.

Figure 3:
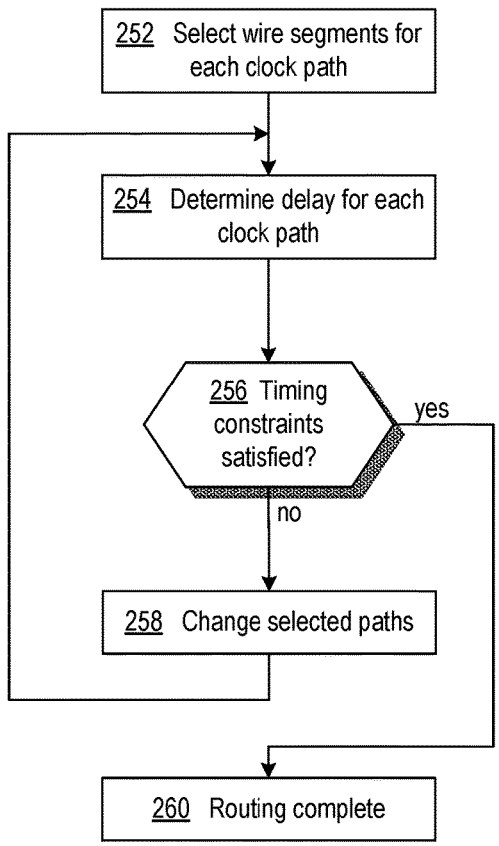
FIG. 3 is a flowchart of a process of routing the clock paths of a circuit design in which proximity effects, metal layer effects, and random variations are used in determining delays of clock signals.

FIG. 3 is a flowchart of a process of routing the clock paths of a circuit design in which proximity effects, metal layer effects, and random variations are used in determining delays of clock signals. At block 252, the EDA tool selects wire segments for each clock path in the circuit design. Each wire segment can include a portion of a horizontal or vertical track, which are shown in FIG. 1. In some circuit designs, a single clock source is connected to multiple clock destinations on parallel paths (e.g., FIG. 6). In selecting wire segments for the parallel clock paths, the EDA tool searches for wire segments that are proximate the same types of physical circuit structures on the IC. For example, if the wire segment selected for one of the parallel clock paths passes over a configurable logic block in a different metal layer, the EDA tool searches for and selects other wire segments that pass over configurable logic blocks for others of the parallel clock paths.

The EDA tool determines the delay of each clock path at block 254. The delays are calculated using proximity factors, metal layer variation factors, and statistical factors for random variations of programmable delay circuits. At decision block 256, the EDA tool determines, based on the computed delays, whether or not the clock paths satisfy the timing constraints, such as setup and hold times, of the circuit design.

At decision block 256, the EDA tool can also perform a clock optimization cost function while accounting for proximity effects, metal layer effects, and random variations in programmable delay circuits. For example, as between two clock paths, the EDA tool determines the respective delays of the first and second clock paths. If the difference between the delays is less than a design-specific timing constraint, the clock paths need not be changed. Otherwise, the EDA tool changes one or both of the clock paths, such as by selecting different wire segments, in order to reduce the difference in delays, as shown by block 258. Once timing constraints are satisfied, routing is complete at block 260.

Figure 4:
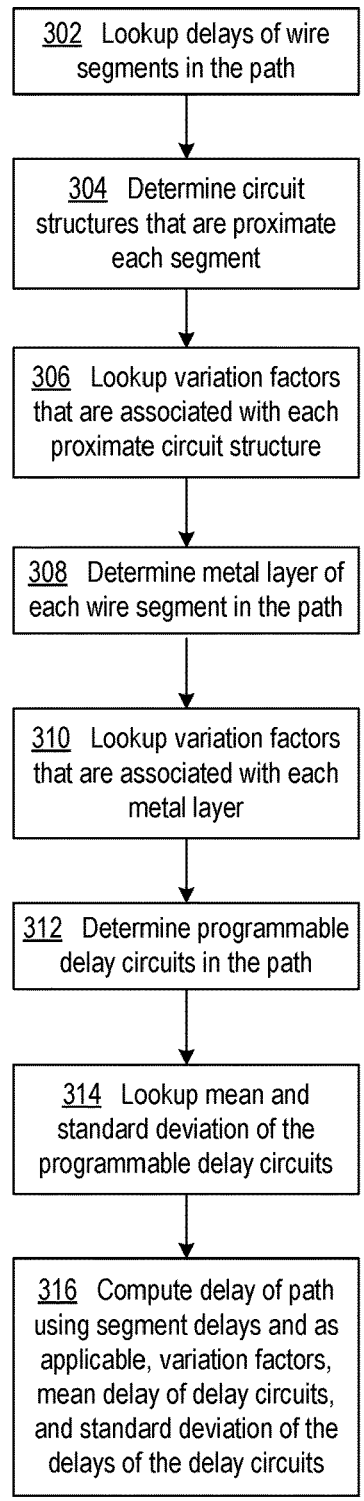
FIG. 4 shows a flowchart of a process in which proximity effects, metal layer effects, and random variations are used in determining the delay of a clock path.
Figure 5:
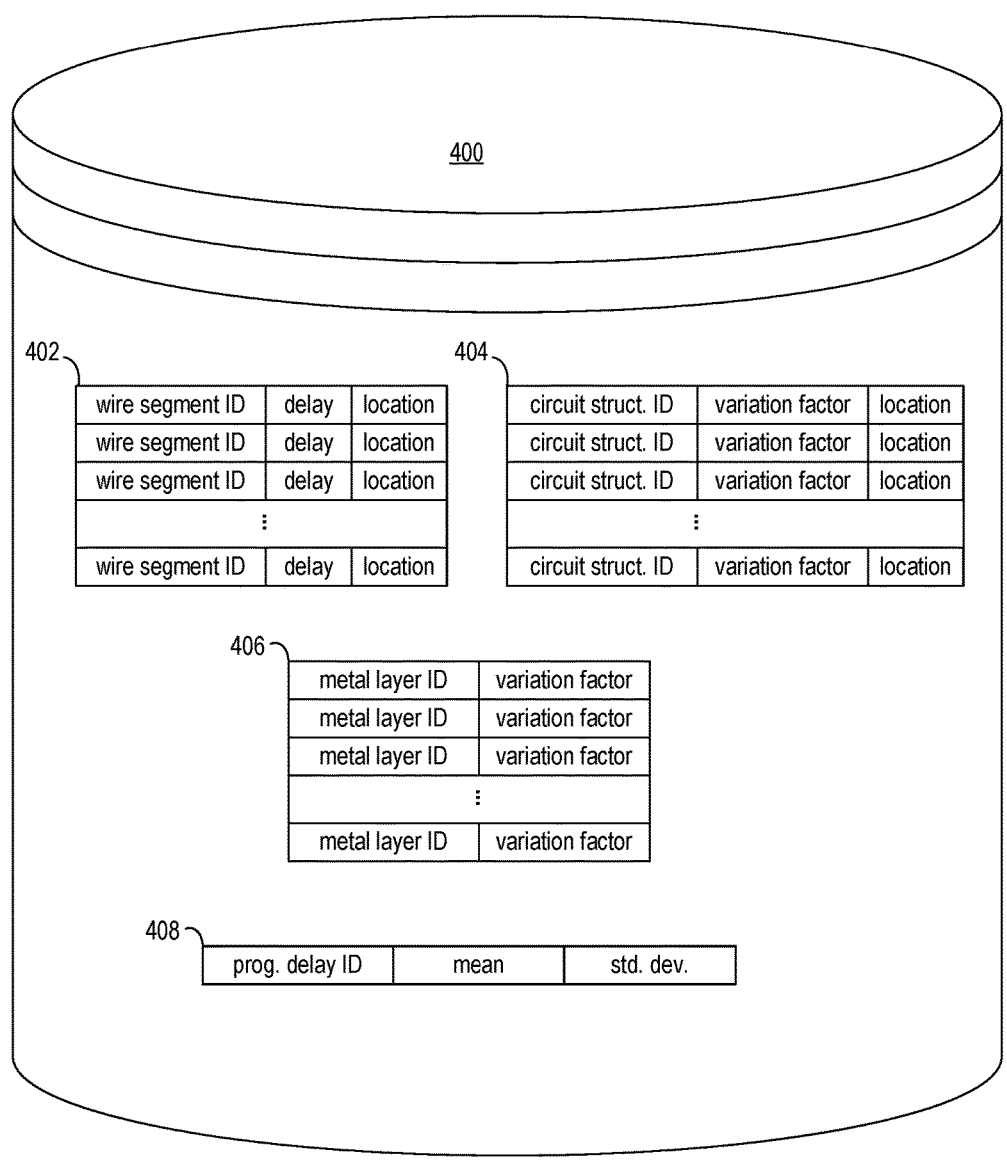
FIG. 5, which contains delay values, variation factors, and statistical data used in computing the delay of the clock path.

FIG. 4 shows a flowchart of a process in which proximity effects, metal layer effects, and random variations are used in determining the delay of a clock path. FIG. 4 is described in conjunction with the database 400 of FIG. 5, which contains delay values, variation factors, and statistical data used in computing the delay of the clock path.

At block 302, the EDA tool looks up a delay value associated with each wire segment in the clock path. The delay values can be stored in database 400 (FIG. 5) that contains identifiers of the different wire segments of the IC and associated delay values. The database can be assembled by the manufacturer of a programmable IC or for a particular IC technology for use by circuit designers who will prepare circuit designs targeted to the IC. Data set 402 shows wire segment identifiers (IDs), delay values associated with the wire segments, and locations of the wire segments. In an example implementation, each part of a vertical or horizontal track that can comprise part of a clock path, has a unique wire segment ID and associated delay value.

The EDA tool at block 304 determines for each wire segment, circuit structures that are proximate the wire segment. The proximate circuit structures may be determined based on the location of the wire segment, which is indicated in the data set 402, and locations of the circuit structures, which are indicated in data set 404. Data set 404 contains circuit structure IDs, associated variation factors, and locations of the identified circuit structures. A circuit structure is determined to be proximate a wire segment if the location of the circuit structure is within a threshold distance from the location of the wire segment or if the wire segment in one metal layer passes over the circuit structure in another metal layer. In a particular implementation involving programmable ICs, the proximate circuit structures may be tile crossings of the wire segments. The location of a wire segment can indicate a set of one or more tiles that the wire segment crosses. For example, tiles in an FPGA may include configurable logic block (CLB) tiles, input/output block (IOB) tiles, block RAM (BRAM) tiles, digital signal processing (DSP) tiles, etc.

At block 306, the EDA tool looks up the variation factor of each circuit structure that is determined to be proximate each wire segment. The variation factor can be a value that describes an additional amount of delay that is caused by the circuit structure and is added to the delay of the wire segment from the data set 402.

The EDA tool at block 308 determines the metal layer of each wire segment. The metal layer may be part of the location information that is stored in association with the wire segment IDs in the data set 402. At block 310, the EDA tool looks up the variation factors of the associated with the metal layer IDs that were identified at block 308. Database 400 stores the metal layer IDs and associated variation factors in data set 406. The metal layer variation factor can be a value that describes an additional amount of delay that is caused by the metal layer and is added to the delay of the wire segment from the data set 402.

At block 312, the EDA tool determines the programmable delay circuits in the clock path. As part of the routing process includes the selection of wire segments and programmable delay circuits, the definition of the clock path specifies the programmable delay circuits in the clock path. The definition of the clock path also specifies the programmed delay value of each programmable delay circuit. Programmable delay circuits are used to balance clock skew. However, the programmable delay circuits are subject to both proximity effects and random variations. The random variations can increase delay or decrease delay for different instances of the programmable delay circuits. At block 314, the EDA tool looks up the mean and standard deviation of the programmable delay circuits in the data set 408 of data base 400.

The EDA tool computes the delay of the clock path at block 316. One or more of the proximity variation factors, metal layer variation factors, and/or the statistical factors of the programmable delay circuits can be used in calculating the delay.

If all of the proximity variation factors, metal layer variation factors, and the statistical factors of the programmable delay circuits are used in calculating the delay, the delay of the clock path having J wire segments Si, and N programmable delay circuits can be computed as:

$$\Sigma_{i=1}^{J}(\text{Delay}_{Si}+P+M)+N(\text{Mean}_{delay})+\sigma/\sqrt{N}$$

where $Delay_{Si}$ is the delay of wire segment i, P is the proximity variation factor determined for wire segment i, M is the metal layer variation factor determined for wire segment i, $Mean_{delay}$ is the mean of the delays of the programmable delay circuits, and σ the standard deviation of the delays of the programmable delay circuits.

Figure 6:
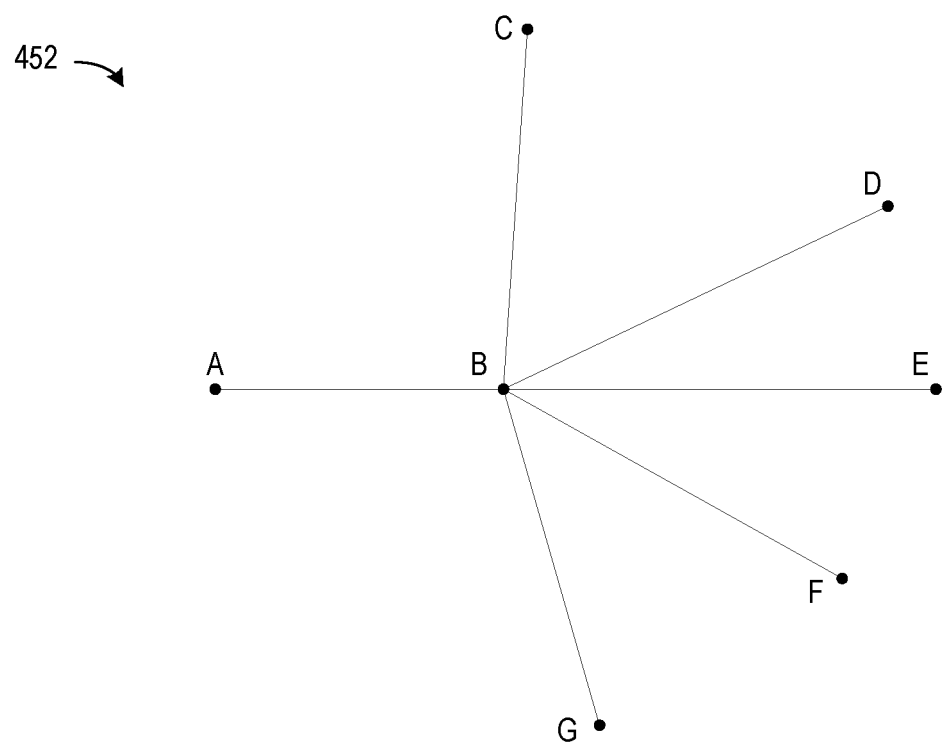
FIG. 6 shows parallel clock paths in an exemplary clock tree.

FIG. 6 shows parallel clock paths in an exemplary clock tree 452. In some implementations, the clock tree is constructed using the disclosed approaches to reduce clock skew between branches of the clock tree. The exemplary clock tree includes clock root A, branch point B, and end points C, D, E, F, and G. Segments BC, BD, BE, BF, and BG of the clock tree are parallel paths from branch point B. Clock skew between the parallel branches can be reduced by constructing similar paths from the branch point.

Similar paths are constructed by selecting wire segments having similar attributes. For example, the wire segments selected for branch BC are similar to the wire segments selected for branch BD. In selecting similar wire segments, the routing process of the EDA tool searches for wire segments that are proximate the same circuit structures of the IC. For example, if a wire segment selected for branch BC crosses a DSP circuit, the routing process selects a wire segment for branch BD that also crosses a DSP circuit. Also, if a wire segment selected for branch BC is in metal layer 8, the routing process selects a wire segment for branch BD that is also in metal layer 8. The routing process selects similar wire segments for all of the branches BC, BD, BE, BF, and BG.

Figure 7:
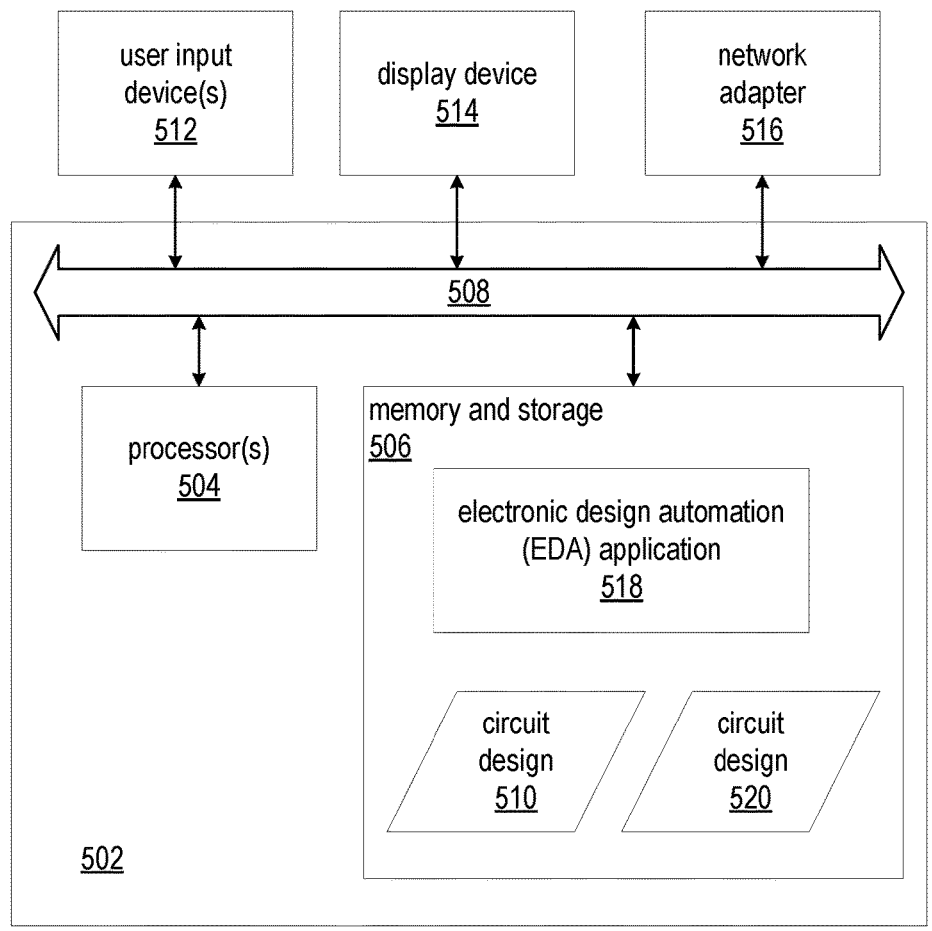
FIG. 7 is a block diagram illustrating an exemplary data processing system.

FIG. 7 is a block diagram illustrating an exemplary data processing system (system) 502. System 502 is an example of an EDA system. As pictured, system 502 includes at least one processor circuit (or "processor"), e.g., a central processing unit (CPU) 504 coupled to memory and storage arrangement 506 through a system bus 508 or other suitable circuitry. System 502 stores program code and circuit design 510 within memory and storage arrangement 506. Processor 504 executes the program code accessed from the memory and storage arrangement 506 via system bus 508. In one aspect, system 502 is implemented as a computer or other data processing system that is suitable for storing and/or executing program code. It should be appreciated, however, that system 502 can be implemented in the form of any system including a processor and memory that is capable of performing the functions described within this disclosure.

Memory and storage arrangement 506 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 502 may also include one or more cache memories (not shown) that provide temporary storage of at least some program code and data in order to reduce the number of times program code and data must be retrieved from local memory and persistent storage during execution.

Input/output (I/O) devices such as user input device(s) 512 and a display device 514 may be optionally coupled to system 502. The I/O devices may be coupled to system 502 either directly or through intervening I/O controllers. A network adapter 516 also can be coupled to system 502 in order to couple system 502 to other systems, computer systems, remote printers, and/or remote storage devices through intervening private or public networks. Modems, cable modems, Ethernet cards, and wireless transceivers are examples of different types of network adapter 516 that can be used with system 502.

Memory and storage arrangement 506 may store an EDA application (or "tool") 518. EDA application 518, being implemented in the form of executable program code, is executed by processor(s) 504. As such, EDA application 518 is considered part of system 502. System 502, while executing EDA application 518, receives and operates on circuit design 510. In one aspect, system 502 performs a design flow on circuit design 510, and the design flow may include synthesis, mapping, placement, routing, and the application of one or more physical optimization techniques as described herein. System 502 generates an optimized, or modified, version of circuit design 510 as circuit design 520.

EDA application 518, circuit design 510, circuit design 520, and any data items used, generated, and/or operated upon by EDA application 518 are functional data structures that impart functionality when employed as part of system 502 or when such elements, including derivations and/or modifications thereof, are loaded into an IC such as a programmable IC causing implementation and/or configuration of a circuit design within the programmable IC.

Figure 8:
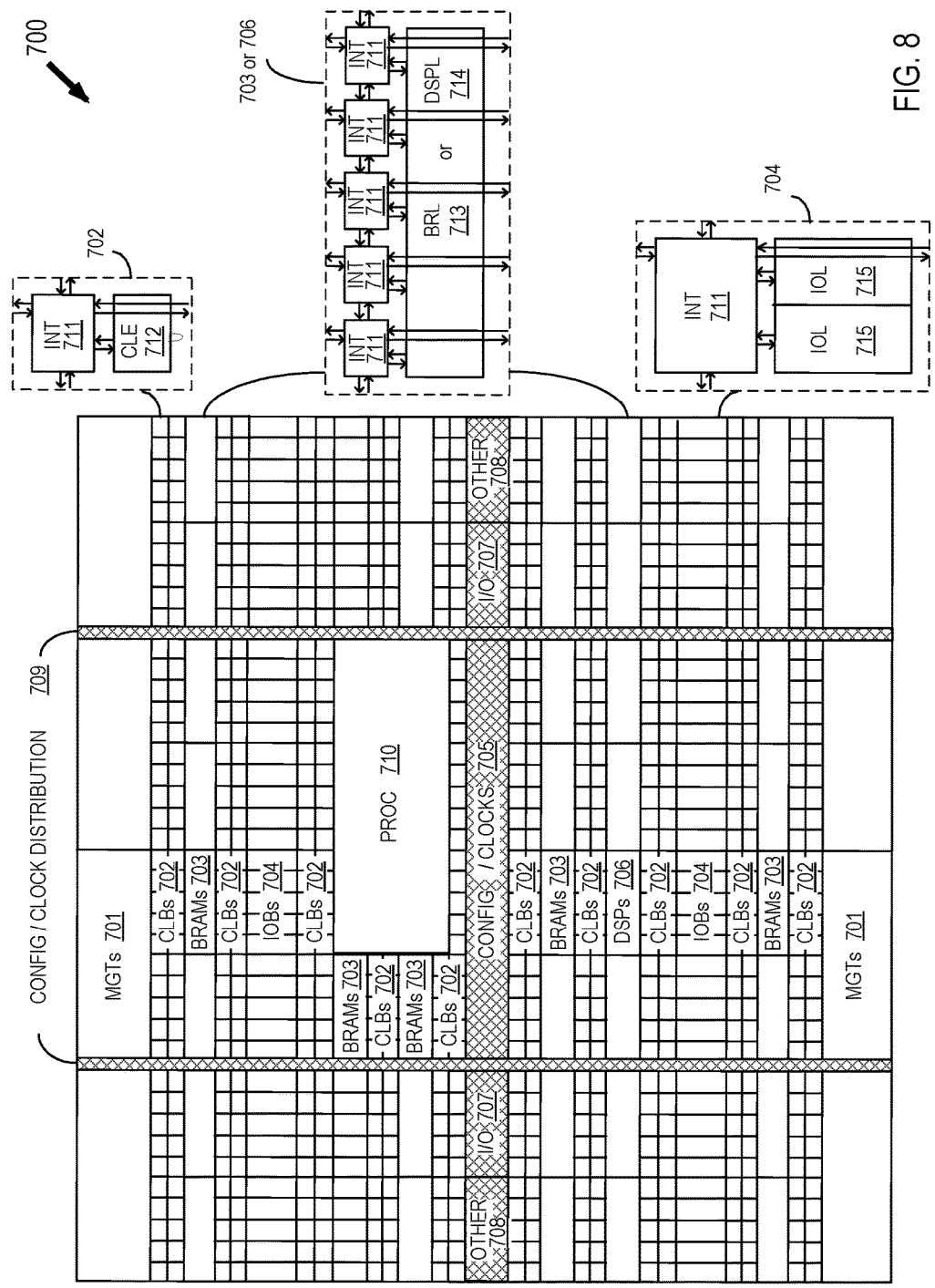
FIG. 8 shows a programmable integrated circuit (IC) on which the disclosed circuits and processes may be implemented.

FIG. 8 shows a programmable integrated circuit (IC) 700 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 8.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

In the pictured embodiment, a columnar area 705 near the center of the die (shown shaded in FIG. 8) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 710 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

The Specification describes and/or illustrates aspects useful for implementing the disclosed implementations by way of various circuits or circuitry. The circuitry may be discussed using terms such as "blocks," "modules," "devices," "systems," "units," "controllers etc. These terms represent circuits (e.g., discrete logic circuitry, computer processor circuits, or programmable circuits) configured and arranged for implementing operations/activities, as may be carried out in the approaches discussed herein. In some implementations, such illustrated items represent computer circuitry which is understood to include a processor circuit connected to memory circuitry that stores code that includes instructions to be executed by the processor circuit (e.g., a CPU). The code can specify how the processing circuit is to perform the disclosed algorithm(s). The specification may also make reference to an adjective that does not connote any attribute of the structure ("first [structure]" and "second [structure]") in which case the adjective is merely used for English-language antecedence to differentiate one such similarly-named structure from another similarly-named or instance of the structure (e.g., "first circuit configured to convert . . . " is interpreted as "circuit configured to convert . . . ").

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for determining delays of clock paths. Other aspects and features will be apparent to those skilled in the art from consideration of the specification. It is intended that the specification and drawings be considered as examples only, with a true scope of the invention being indicated by the following claims.

What is claimed is:

1. A method of processing a circuit design, comprising:
inputting the circuit design to a programmed processor, wherein the circuit design specifies a clock signal;
selecting by the processor, a plurality of wire segments of a programmable integrated circuit (IC) for a clock path to carry the clock signal;
determining by the processor, proximate circuit structures that are proximate the plurality of wire segments;
determining by the processor a delay of the clock path based on delay values associated with identifiers of the wire segments and one or more variation factors, wherein the one or more variation factors include proximity variation factors associated with the proximate circuit structures;
generating configuration data from the circuit design in response to the delay of the clock path satisfying a timing constraint; and
configuring the programmable IC with the configuration data to implement a circuit according to the circuit design.

2. The method of claim 1, further comprising:
storing in a memory identifiers of metal layers of the programmable IC on which the wire segments are disposed; and
wherein the one or more variation factors include layer variation factors associated with the identifiers of the metal layers.

3. The method of claim 1, wherein:
the clock path includes N delay circuits having a mean delay M and a standard deviation S, wherein N>2; and
the one or more variation factors include a random variation factor that is $N*M+S/\sqrt{N}$.

4. The method of claim 1, wherein:
the selecting the plurality of wire segments includes selecting wire segments that form parallel circuit paths; and
the selecting wire segments that form parallel circuit paths includes
searching for wire segments proximate same types of circuit structures of the programmable IC for each parallel circuit path.

5. The method of claim 4, wherein the same types of circuit structures include a type of circuit over which each parallel circuit path crosses.

6. The method of claim 5, wherein the type of circuit over which each parallel circuit path crosses includes a configurable logic block, an input/output block, a block RAM, or a digital signal processing block.

7. A method of processing a circuit design, comprising:
inputting the circuit design to a programmed processor, wherein the circuit design specifies a clock signal;
selecting by the processor, a first plurality of wire segments of a programmable integrated circuit (IC) for a first clock path and a second plurality of wire segments for a second clock path to carry the clock signal;
determining by the processor proximate circuit structures that are proximate the first plurality of wire segments and the second plurality of wire segments;
determining by the processor a first delay of the first clock path based on delay values associated with identifiers of the first plurality of wire segments and one or more variation factors, wherein the one or more variation factors include proximity variation factors associated with the proximate circuit structures;
determining by the processor a second delay of the second clock path based on delay values associated with identifiers of the second plurality of wire segments and the one or more variation factors;

generating configuration data from the circuit design in response to a difference between the first delay and the second delay satisfying a timing constraint; and configuring the programmable IC with the configuration data to implement a circuit according to the circuit design.

8. The method of claim 7, further comprising:

storing in a memory identifiers of metal layers of the programmable IC on which the first plurality and the second plurality of wire segments are disposed;

wherein the one or more variation factors include layer variation factors associated with the identifiers of the metal layers.

9. The method of claim 7, wherein:

the first clock path includes $N_1$ delay circuits having a mean delay $M_1$ and a standard deviation $S_1$, wherein $N_1 > 2$;

the one or more variation factors include a first random variation factor that is $N_1 * M_1 + S_1/\sqrt{N_1}$;

the second clock path includes K delay circuits having a mean delay J and a standard deviation T, wherein $K > 2$; and the one or more variation factors include a first random variation factor that is $K/*J + T/\sqrt{K}$.

10. The method of claim 7, wherein:

the selecting the first plurality of wire segments includes selecting first wire segments that form first parallel circuit paths; and the selecting first wire segments that form first parallel circuit paths includes searching for wire segments proximate same types of circuit structures of the programmable IC for each first parallel circuit path;

the selecting the second plurality of wire segments includes selecting second wire segments that form second parallel circuit paths; and the selecting second wire segments that form second parallel circuit paths includes searching for wire segments proximate same types of circuit structures of the programmable IC for each second parallel circuit path.

11. The method of claim 10, wherein the same types of circuit structures include a type of circuit over which each parallel circuit path crosses.

12. The method of claim 11, wherein the type of circuit over which each parallel circuit path crosses includes a configurable logic block, an input/output block, a block RAM, or a digital signal processing block.

13. The method of claim 7 wherein the generating the circuit includes configuring the programmable IC with the configuration data.

14. A system comprising:

a processor;

a memory coupled to the processor, wherein the memory is configured with instructions that when executed by the processor cause the processor to perform operations for processing a circuit design, including:

inputting the circuit design that specifies a clock signal;

selecting a plurality of wire segments of a programmable integrated circuit (IC) for a clock path to carry the clock signal;

determining by the processor, proximate circuit structures that are proximate the plurality of wire segments;

determining a delay of the clock path based on delay values associated with identifiers of the wire segments and one or more variation factors, wherein the one or more variation factors include proximity variation factors associated with the proximate circuit structures;

generating configuration data from the circuit design in response to the delay of the clock path satisfying a timing constraint; and configuring the programmable IC with the configuration data to implement a circuit according to the circuit design.

15. The system of claim 14, wherein the memory is further configured with instructions that when executed by the processor cause the processor to store in a memory identifiers of metal layers of the programmable IC on which the wire segments are disposed; and wherein the one or more variation factors include layer variation factors associated with the identifiers of the metal layers.

16. The system of claim 15, wherein:

the clock path includes N delay circuits having a mean delay M and a standard deviation S, wherein $N > 2$;

the one or more variation factors include a random variation factor that is $N*M + S/\sqrt{N}$.

* * * * *